Patented Sept. 22, 1953

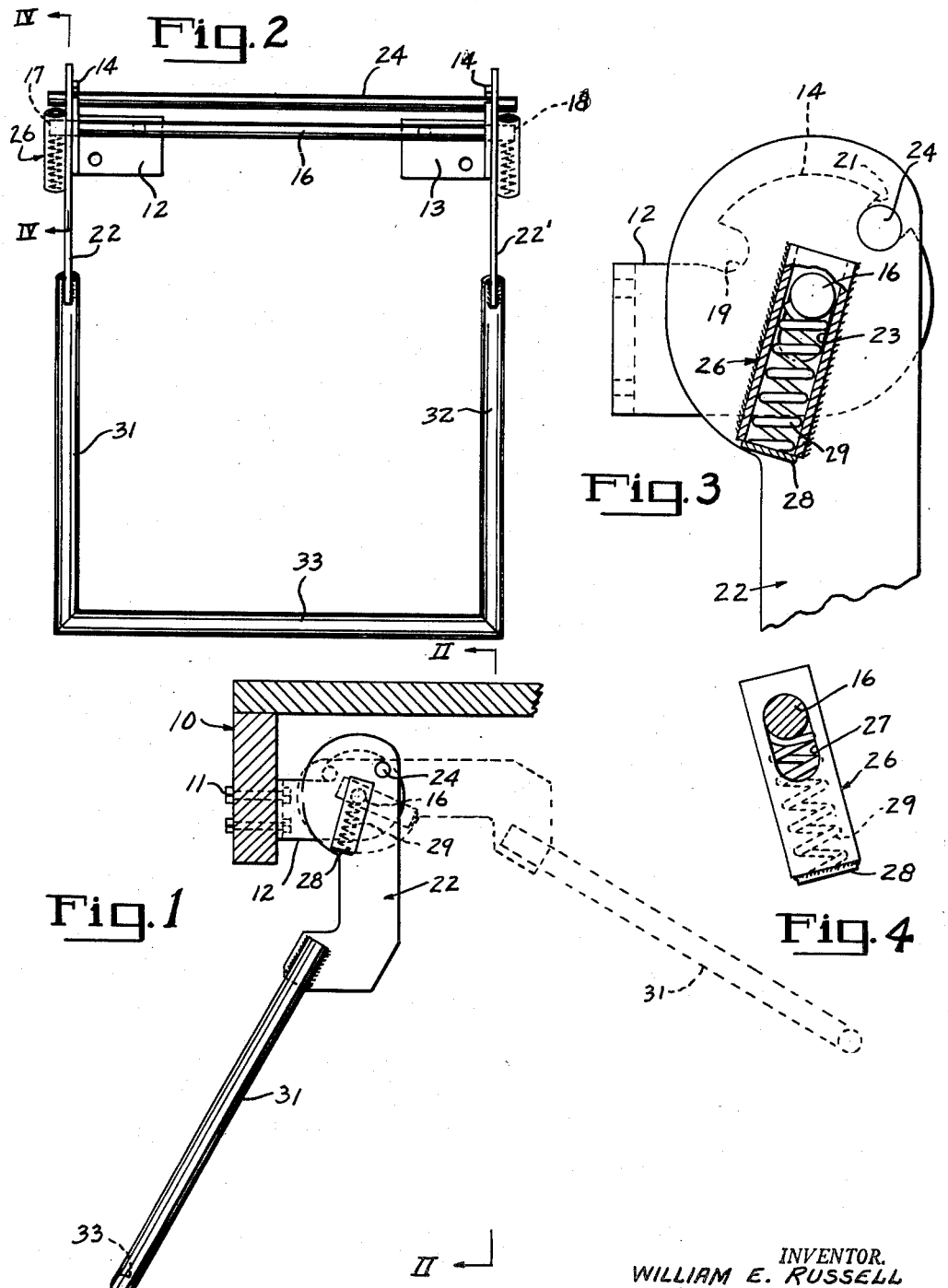

2,653,036

UNITED STATES PATENT OFFICE 2,653,036

SWINGABLE VEHICLE STEP

James E. Creel, Warrior, and William E. Russell, Birmingham, Ala.

Application August 1, 1951, Serial No. 239,712

5 Claims. (Cl. 280—166)

This invention relates to a vehicle step, more particularly to a retractable step for trucks of the type employed for transporting package goods from place to place.

An object of our invention is to provide a vehicle step which is easily moved outwardly with respect to the vehicle body when the step is in use and inwardly of and beneath the vehicle body, out of the way, when the step is not in use.

A further object of our invention is to provide a step of the character designated having improved locking means for holding the step in either extended or retracted position.

A still further object of our invention is to provide a vehicle step which is simple of construction, economical of manufacture and one which is easily installed on various types of trucks or like vehicles.

Apparatus embodying features of our invention is illustrated in the accompanying drawings forming a part of this application in which:

Fig. 1 is a side elevational view showing the step secured to a vehicle body;

Fig. 2 is a rear elevational view thereof taken along the line II—II of Fig. 1;

Fig. 3 is an enlarged detail view of the means for locking the step in either the extended or retracted position; and Fig. 4 is a detail sectional view taken along the line IV—IV of Fig. 2.

Referring now to the drawings for a better understanding of our invention, we show a fragment of a vehicle body 10. Secured to the body 10 by any suitable means such as bolts 11 are a pair of horizontally spaced L-shaped brackets 12 and 13 each having a portion 14 extending inwardly underneath the vehicle body 10. The brackets are relatively flat and are positioned on the body 10 so that the inwardly extending portions thereof lie in substantially vertical planes. The inner portions 14 of the brackets are rounded as shown. Extending between and lying in a plane substantially normal to the inwardly extending portions 14 of the brackets 12 and 13 is a rod or pin 16 which passes through suitable openings in the portions 14 and projects outwardly from each side thereof as at 17 and 18. The rod 16 is rigidly secured to the bracket by any suitable means such as by welding. Similarly spaced notches 19 and 21 are provided in the upper periphery of portions 14 of the brackets 12 and 13 and are positioned at points substantially equidistant from the adjacent projecting end of the rod 16.

Pivotally mounted on the pin 16 are side members in the form of elongated plates 22 and 22', each of which is provided with an elongated slot or opening 23 adjacent the upper central portion thereof through which the pin 16 passes. Extending between and secured to the plates 22 and 22' is a rod 24. The rod 24 is so positioned in the plates that it may be engaged in either of the notches 19 or 21.

Secured to each of the plates 22 and 22' as by welding is a downwardly extending sleeve member 26 which is provided with an elongated opening 27 positioned opposite and coinciding with the elongated opening 23 of the plate to which it is secured. The lower end of each sleeve member 26 is closed by a plate 28. Positioned within each sleeve 26 is a pressure spring 29 which presses against the projecting end of the rod 16 and biases the associated plate 22 or 22' in a direction to cause the pin 24 to engage in the selected notch 19 or 21 as the case may be.

Secured to the lower end of each of the side members or plates 22 and 22' are side extension members 31 and 32. Extending between and connected to the lower ends of the side extension members 31 and 32 is a step member 33 which forms the step proper for the device.

From the foregoing description the operation of our improved step will be readily understood. In Fig. 1 of the drawings the step is shown in full lines in position for use and in dotted lines in the retracted position. To move the step from the extended position to the retracted position the plates 22 and 22' are moved upwardly, by moving the step proper 33 upward, thereby compressing the spring 29 and moving the rod 24 out of the notches 21. The step proper 33 may then be moved inwardly and beneath the truck body until the rod 24 is opposite the notches 19. In this position the rod 24 is forced into the notches 19 by the spring 29, thus locking the step in retracted position. To move the step from retracted position to extended position the step proper is moved outwardly to compress the spring 29 thus moving the rod 24 out of the notches 19. The step is then swung about the rod 16 until the rod 24 is opposite the notches 21. The rod 24 remains in the selected notches due to the pressure exerted by the spring 29 against the ends 17 and 18 of the rod 16.

While we have disclosed a rod 16 as extending between and secured to the brackets 12 and 13 and a rod 24 as extending between and secured to the side members 22 and 22', it will be apparent that in place of the rods, outwardly extending detents or projections may be secured to the brackets and inwardly extending detents or projections may be secured to the side members. However, we prefer to employ the rods due to the fact that a more sturdy step is thus provided.

From the foregoing it will be apparent that we have devised an improved vehicle step which may be easily and readily moved to an extended position or to a retracted position and one which is securely locked in either the extended or retracted position. It will also be apparent that we have devised a vehicle step which may be easily installed on various types of vehicle bodies now in use.

While we have shown our invention in but one form, it will be obvious to those skilled in the art that it is not so limited but is susceptible to various changes and modifications without departing from the spirit thereof, and we desire, therefore, that only such limitations shall be placed thereupon as are specifically set forth in the appended claims.

What we claim is:

1. A vehicle step comprising a pair of horizontally spaced brackets extending inwardly under the vehicle, side members pivotally mounted on the brackets by means of a slot and pivot pin connection, there being a pair of similarly spaced notches in the upper periphery of each bracket positioned substantially equidistant from the pivot pin, a detent carried by each side member in position to lie in selected notches and hold the side members selectively in retracted or extended position, means carried by the side members biasing the detents into engagement with selected notches and a step member carried by and connecting the lower ends of said side members.

2. A vehicle step comprising a pair of horizontally spaced brackets, each bracket having a relatively flat portion lying in a vertical plane and extending inwardly under the vehicle, a relatively flat side member pivotally mounted on each bracket by means of a slot and pivot pin connection, a detent carried by each side member, there being similarly spaced notches in each bracket in position to receive their associated detent and hold the side members in retracted or extended position, means carried by each side member biasing said detents into engagement with selected notches, and a step carried by and connecting the lower ends of said side members.

3. A vehicle step comprising a pair of horizontally spaced brackets extending inwardly under the vehicle, there being a laterally extending opening in the inwardly extending portion of each bracket, a rod extending between said brackets and through the openings therein and projecting outwardly of each bracket, side members having downwardly extending elongated openings therein slidably receiving the outwardly extending ends of said rod, a second rod extending between and secured to the upper portion of said side members, there being similarly spaced notches in each bracket in position to receive said second rod and hold the side members in retracted or extended position, means carried by each side member biasing said second rod into engagement with selected notches, and a step carried by and connecting the lower ends of said side members.

4. A vehicle step comprising a pair of horizontally spaced brackets extending inwardly under the vehicle, side members pivotally mounted on the brackets by means of a slot and pivot pin connection, there being a pair of similarly spaced notches in the upper periphery of each bracket positioned substantially equidistant from the pivot pin, a detent carried by each side member in position to lie in selected notches and hold the side members selectively in retracted or extended position, a downwardly extending sleeve secured to each side member, said sleeve having an elongated opening in the upper portion thereof coinciding with said slot for the pivot pin and receiving one end of the pivot pin, a compression spring in said sleeve beneath said pivot pin, a spring abutment in the lower end of the sleeve, and a step member carried by and connecting the lower ends of said side members.

5. A vehicle step comprising a pair of horizontally spaced brackets extending inwardly under the vehicle, there being a laterally extending opening in the inwardly extending portion of each bracket, a rod extending between said brackets and through the openings therein and projecting outwardly of each bracket, side members having downwardly extending elongated openings therein slidably receiving the outwardly extending ends of said rod, a second rod extending between and secured to the upper portion of said side members, there being similarly spaced notches in each bracket in position to receive said second rod and hold the side members in retracted or extended position, a short sleeve member secured to each side member and having an elongated opening therein adjacent its upper end coinciding with the elongated opening in the associated side member, a compression spring in each sleeve biasing said side members in a direction to cause said second rod to engage selected notches, a spring abutment in the lower end of each sleeve, and a step carried by and connecting the lower ends of said side members.

JAMES E. CREEL.
WILLIAM E. RUSSELL.

References Cited in the file of this patent

UNITED STATES PATENTS

| Number | Name | Date |
|---|---|---|
| 868,352 | Marr | Oct. 15, 1907 |
| 1,017,488 | Zimdars | Feb. 13, 1912 |
| 1,200,477 | Franz | Oct. 10, 1916 |
| 1,666,568 | Jackson | Apr. 17, 1928 |
| 1,762,052 | Dodds | June 3, 1930 |

FOREIGN PATENTS

| Number | Country | Date |
|---|---|---|
| 12,177 | Great Britain | Oct. 13, 1885 |